(12) United States Patent
Finn et al.

(10) Patent No.: US 6,295,364 B1
(45) Date of Patent: Sep. 25, 2001

(54) SIMPLIFIED COMMUNICATION SYSTEM

(75) Inventors: Brian M. Finn, Madison; Thomas O. Roe, Stoughton; Michael P. Nowak, Greendale, all of WI (US)

(73) Assignee: Digisonix, LLC, Madison, WI (US)

( * ) Notice: Subject to any disclaimer, the term of this patent is extended or adjusted under 35 U.S.C. 154(b) by 0 days.

(21) Appl. No.: 09/050,511

(22) Filed: Mar. 30, 1998

(51) Int. Cl.[7] ....................................................... H03G 3/20
(52) U.S. Cl. .................................. 381/110; 86/57; 86/71.4
(58) Field of Search ................................... 381/71.4, 71.1, 381/57, 110, 86; 379/406, 410, 409

(56) References Cited

U.S. PATENT DOCUMENTS

| | | | |
|---|---|---|---|
| 4,602,337 | * 7/1986 | Cox | 381/93 |
| 5,033,082 | 7/1991 | Eriksson et al. . | |
| 5,111,508 | * 5/1992 | Gale et al. | 381/86 |
| 5,172,416 | 12/1992 | Allie et al. . | |
| 5,243,659 | * 9/1993 | Stafford et al. | 381/86 |
| 5,355,419 | * 10/1994 | Yamamoto et al. | 381/86 |
| 5,396,561 | 3/1995 | Popovich et al. . | |
| 5,544,242 | * 8/1996 | Robinson | 379/390 |
| 5,602,928 | 2/1997 | Eriksson et al. . | |
| 5,706,344 | 1/1998 | Finn . | |
| 5,715,320 | 2/1998 | Allie et al. . | |
| 5,940,486 | * 8/1999 | Schlaff | 379/167 |
| 6,031,918 | * 2/2000 | Chahabadi | 381/94.1 |

OTHER PUBLICATIONS

*Digital Processing of Speech Signals,* Lawrence R. Rabiner, Ronald W. Schafer, 1978, Bell Laboratories, Inc. Prentice–Hall, pp. 120–126.

"DFR11EQ Digital Feedback Reducer and Graphic Equalizer With Software Interface for Windows", Model DFR11EQ User Guide, Shure Brothers Incorporated, 222 Hartrey Avenue, Evanston, IL 60202–3696, 1996.

\* cited by examiner

*Primary Examiner*—Forester W. Isen
*Assistant Examiner*—Brian Tyrone Pendleton
(74) *Attorney, Agent, or Firm*—Andrus, Sceales, Starke & Sawall, LLP

(57) ABSTRACT

A digital voice enhancement communication system, including a simplex system, has first and second acoustic zones, and respective microphones and loudspeakers. A voice sensitive gated switch has a first mode supplying the output of a first microphone in the first zone over a first channel to a second loudspeaker in the second zone, and has a second mode supplying the output of a second microphone in the second zone over a second channel to the first loudspeaker in the first zone. First and second noise sensitive bandpass filters and first and second equalization filters are provided in the first and second channels, respectively. Each noise sensitive bandpass filter is a noise responsive highpass filter having a filter cutoff effective at elevated noise levels and reducing bandwidth and making more gain available, to improve intelligibility of speech of a person in the respective zone transmitted from the respective microphone to the loudspeaker in the other zone. Each equalization filter reduces resonance peaks in the acoustic transfer function between the receiving loudspeaker in the other zone and the sending microphone in the one zone to reduce feedback by damping resonance peaks.

7 Claims, 1 Drawing Sheet

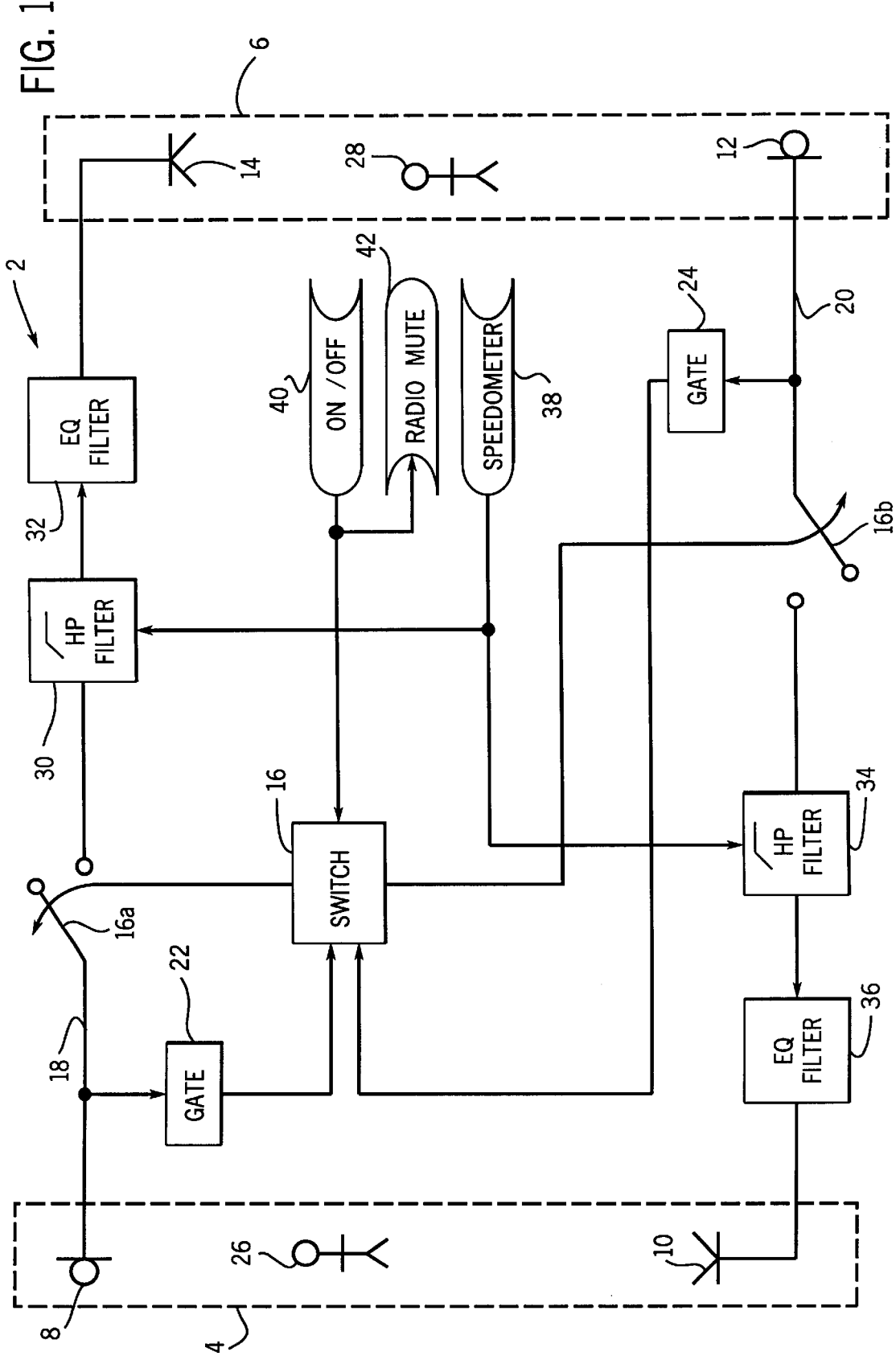

SIMPLIFIED COMMUNICATION SYSTEM

BACKGROUND AND SUMMARY

The invention relates to digital voice enhancement, DVE, communication systems, including simplex systems.

The invention arose during development efforts directed toward reducing complexities of full duplex voice communication systems, i.e. bidirectional voice transmission where talkers exchange information simultaneously. In a full duplex system, acoustic echo cancellation is needed to overcome feedback generated by closed loop communication channel instabilities. Use of a simplex scheme that alternately selects one or another microphone or channel as active is another way to effectively control feedback into a near end microphone from a near end loudspeaker. In a simplex system, voice transmission is unidirectional, i.e. either one way or the other way at any given time, but not in both directions at the same time.

A simplex digital voice enhancement communication system does not rely on acoustic echo cancellation to ensure stable communication loop gains for closely coupled microphones and loudspeakers. However, there is a potential for feedback into a near end microphone from a far end loudspeaker. This situation exists because it would be self-defeating to have the active microphone switched off. The present invention addresses and solves this problem in a particularly simple and effective manner with a combination of readily available known components.

BRIEF DESCRIPTION OF THE DRAWING

FIG. 1 schematically illustrates a digital voice enhancement communication system in accordance with the invention.

DETAILED DESCRIPTION

FIG. 1 shows a simplex digital voice enhancement communication system 2 including a first acoustic zone 4, a second acoustic zone 6, a first microphone 8 in the first zone, a first loudspeaker 10 in the first zone, a second microphone 12 in the second zone, and a second loudspeaker 14 in the second zone. A voice sensitive gated switch 16 has a first mode with switch element 16a closed and supplying the output of microphone 8 over a first channel 18 to loudspeaker 14. Switch 16 has a second mode with switch element 16b closed and supplying the output of microphone 12 over a second channel 20 to loudspeaker 10. The noted first and second modes are mutually exclusive such that only one of the channels 18 and 20 can be active at a time. In the first mode, switch element 16a is closed and switch element 16b is open such that the switch blocks, or at least substantially reduces, transmission from microphone 12 to loudspeaker 10. In the second mode, switch element 16b is closed and switch element 16a is open to block or substantially reduce transmission from microphone 8 to loudspeaker 14. Voice activity detectors or gates 22 and 24 have respective inputs from microphones 8 and 12, for controlling operation of switch 16. When switch 16 is in its first mode, with switch element 16a closed and switch element 16b open, the speech of person 26 in zone 4 can be heard by person 28 in zone 6 as broadcast by speaker 14 receiving the output of microphone 8. The speech of person 28 and the output of speaker 14 as picked up by microphone 12 are not transmitted to speaker 10 because switch element 16b is open. Thus, there is no echo transmission of the voice of person 26 back through microphone 12 and speaker 10, and hence no need to cancel same. This provides the above noted simplification in circuitry and processing otherwise required for echo cancellation. The same considerations apply in the noted second mode of switch 16, with switch element 16b closed and switch element 16a open, wherein there is no rebroadcast by speaker 14 of the speech of person 28 and hence no echo and hence no need to cancel same. A suitable gate and switch combination 22, 24, 16 uses a short-time, average magnitude estimating function to detect if a voice signal is present in the respective channel. Other suitable estimating functions are disclosed in *Digital Processing of Speech Signals*, Lawrence R. Rabiner, Ronald W. Schafer, 1978, Bell Laboratories, Inc., Prentice-Hall, pp. 120–126, and also as noted in U.S. Pat. No. 5,706,344, incorporated herein by reference.

A first noise sensitive bandpass filter 30 and a first equalization filter 32 are provided in first channel 18. A second noise sensitive bandpass filter 34 and a second equalization filter 36 are provided in second channel 20. Noise sensitive bandpass filter 30 is a noise responsive highpass filter having a filter cutoff frequency effective at elevated noise levels and reducing bandwidth and making more gain available, to improve intelligibility of speech of person 26 transmitted from microphone 8 to loudspeaker 14, and as disclosed in U.S. application Ser. No. 08/927,874, filed Sep. 11, 1997, incorporated herein by reference. Noise sensitive bandpass filter 34 is like filter 30 and is a noise responsive highpass filter having a filter cutoff effective at elevated noise levels and reducing bandwidth and making more gain available, to improve intelligibility or quality of speech of person 28 transmitted from microphone 12 to loudspeaker 10. Equalization filter 32 reduces resonance peaks in the acoustic transfer function between loudspeaker 14 and microphone 8 to reduce feedback by damping the resonance peaks. This is desirable because in various applications, including vehicle implementations where zone 6 is the back seat and zone 4 is the front seat, there may be acoustic coupling between speaker 14 and microphone 8. The resonance peaks may or may not be unstable, depending on total system gain. The equalization filter can take several forms including but not limited to graphic, parametric, inverse, adaptive, and as disclosed in U.S. Pat. Nos. 5,172, 416, 5,396,561, 5,715,320, all incorporated herein by reference. The equalization filter may also take the form of a notch filter designed to selectively remove transfer function resonance peaks. Such a filter could be adaptive or determined offline based on the acoustic characteristics of a particular system. In one embodiment, equalization filter 32 is a set of one or more frequency selective notch filters determined from the acoustic transfer unction between loudspeaker 14 in zone 6 and microphone 8 in zone 4. Equalization filter 36 is like filter 32 and reduces resonance peaks in the acoustic transfer function between loudspeaker 10 and microphone 12 to reduce feedback by damping resonance peaks.

In the above noted vehicle implementation, each of highpass filters 30 and 34 is vehicle speed sensitive, preferably by having an input from the vehicle speedometer 38. At higher vehicle speeds and resulting higher noise levels, lower frequency speech content is blocked and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech. At lower vehicle speeds and resulting lower noise levels, the cutoff frequency of each of highpass filters 30 and 34 is lowered such that lower frequency speech content is passed, in addition to higher frequency speech content, to provide enriched low frequency performance, and overcome objections to a tinny sounding system. In vehicles having an in-cabin audio system, i.e. a radio and/or tape player and/or compact disc player and/or mobile phone, a digital voice enhancement activation switch 40 is provided for actuating and deactuating the voice sensitive gated switch 16, i.e. turn the latter on or off, and providing an audio mute signal muting, or reducing to some specified level, the in-cabin audio system as shown at radio mute 42.

In one embodiment, equalization filter 32 is a first frequency responsive spectral transfer function, and equalization filter 36 is a second frequency responsive spectral transfer function each for example as disclosed in above noted U.S. Pat. No. 5,715,320. The first frequency responsive spectral transfer function is a function of a model of the acoustic transfer function between loudspeaker 14 and microphone 8. The second frequency responsive spectral transfer function of filter 36 is a function of a model of the acoustic transfer function between loudspeaker 10 and microphone 12. In some embodiments, these first and second acoustic transfer functions are the same, e.g. where zones 4 and 6 are small, and in some implementations these first and second acoustic transfer functions are different. In one preferred form, the first frequency responsive spectral transfer function of filter 32 is the inverse of the noted first acoustic transfer function between loudspeaker 14 and microphone 8, for example as disclosed in above noted U.S. Pat. No. 5,715,320. Likewise, the noted second frequency responsive spectral transfer function of filter 36 is the inverse of the noted second acoustic transfer function between loudspeaker 10 and microphone 12, also as in above noted U.S. Pat. No. 5,715,320.

The disclosed combination is simple and effective, and is particularly desirable because it enables use of available known components. By using a speed variable highpass filter in the communication channel, the digital voice enhancement system does not excite lower order cabin modes in vehicle implementations. The highpass filter also greatly reduces transmitted wind and road noises, which are a function of speed, improving the overall sound quality of the digital voice enhancement system. No losses in speech quality are perceived due to aural masking effects from the in-cabin noise. Secondly, the post-processing equalization filter minimizes resonance peaks in the total acoustic transfer function. This has the benefit of reducing the potential for feedback by damping resonance peaks, and also creating a more natural sounding reproduction of speech. The audio mute signal from activation switch 40 is desirable so that when the user selects the digital voice enhancement system, the in-cabin audio system, if present, is disabled, or its output significantly reduced, i.e. muted, as shown at radio mute 42. This prevents the digital voice enhancement system from detecting false information from the audio system and prevents distortions of the audio system by not allowing the digital voice enhancement system to rebroadcast the audio program.

It is recognized that various equivalents, alternatives and modifications are possible within the scope of the appended claims.

What is claimed is:

1. A simplex digital voice enhancement communication system comprising in combination:
    a first acoustic zone;
    a second acoustic zone;
    a first microphone in said first zone;
    a first loudspeaker in said first zone, said first loudspeaker being acoustically coupled to said first microphone;
    a second microphone in said second zone;
    a second loudspeaker in said second zone, said second loudspeaker being acoustically coupled to said second microphone;
    a voice sensitive gated switch having a first mode supplying the output of said first microphone over a first channel to said second loudspeaker, and having a second mode supplying the output of said second microphone over a second channel to said first loudspeaker;
    a first noise sensitive bandpass filter in said first channel;
    a first equalization filter in said first channel;
    a second noise sensitive bandpass filter in said second channel;
    a second noise sensitive bandpass filter in said second channel;
    a second equalization filter in said second channel;
    wherein:
        said first microphone is acoustically coupled to said second loudspeaker;
        said second microphone is acoustically coupled to said first loudspeaker;
        said voice sensitive gated switch comprises two voice activity detector gates, a first gate detecting the output of said first microphone, and a second gate detecting the output of said second microphone.

2. The system according to claim 1 wherein:
    said voice sensitive gated switch in said first mode substantially blocks transmission from said second microphone to said first loudspeaker;
    said voice sensitive gated switch in said second mode substantially blocks transmission from said first microphone to said second loudspeaker;
    said first and second modes of said voice sensitive gated switch are mutually exclusive such that only one of said channels can be active at a time;
    said first noise sensitive bandpass filter comprises a noise responsive highpass filter having a filter cutoff effective at elevated noise levels and reducing bandwidth and making more gain available, to improve intelligibility of speech of a first person in said first zone transmitted from said first microphone to said second loudspeaker;
    said first equalization filter reduces resonance peaks in the acoustic transfer function between said second loudspeaker in said second zone and said first microphone in said first zone to reduce feedback by damping resonance peaks;
    said second noise sensitive bandpass filter comprises a second noise responsive highpass filter having a filter cutoff effective at elevated noise levels and reducing bandwidth and making more gain available, to improve intelligibility of speech of a second person in said second zone transmitted from said second microphone to said first loudspeaker;
    said second equalization filter reduces resonance peaks in the acoustic transfer function between said first loudspeaker in said first zone and said second microphone in said second zone to reduce feedback by damping resonance peaks.

3. The system according to claim 2 wherein:
    said first equalization filter comprises a first spectral transfer function;

said second equalization filter comprises a second spectral transfer function.

4. The system according to claim 2 wherein:

said first equalization filter comprises a set of one or more frequency selective notch filters determined from said acoustic transfer function between said second loudspeaker in said second zone and said first microphone in said first zone;

said second equalization filter comprises a set of one or more frequency selective notch filters determined from said acoustic transfer function between said first loudspeaker in said first zone and said second microphone in said second zone.

5. A simplex digital voice enhancement communication system comprising in combination:

a first acoustic zone;

a second acoustic zone;

a first microphone in said first zone;

a first loudspeaker in said first zone;

a second microphone in said second zone;

a second loudspeaker in said second zone;

a voice sensitive gated switch having a first mode supplying the output of said first microphone over a first channel to said second loudspeaker, and having a second mode supplying the output of said second microphone over a second channel to said first loudspeaker;

a first noise sensitive bandpass filter in said first channel;

a first equalization filter in said first channel;

a second noise sensitive bandpass filter in said second channel;

a second noise sensitive bandpass filter in said second channel;

a second equalization filter in said second channel, wherein:

said voice sensitive gated switch in said first mode substantially blocks transmission from said second microphone to said first loudspeaker;

said voice sensitive gated switch in said second mode substantially blocks transmission from said first microphone to said second loudspeaker;

said first and second modes of said voice sensitive gated switch are mutually exclusive such that only one of said channels can be active at a time;

said first noise sensitive bandpass filter comprises a noise responsive highpass filter having a filter cutoff effective at elevated noise levels and reducing bandwidth and making more gain available, to improve intelligibility of speech of a first person in said first zone transmitted from said first microphone to said second loudspeaker;

said first equalization filter reduces resonance peaks in the acoustic transfer function between said second loudspeaker in said second zone and said first microphone in said first zone to reduce feedback by damping resonance peaks;

said second noise sensitive bandpass filter comprises a second noise responsive highpass filter having a filter cutoff effective at elevated noise levels and reducing bandwidth and making more gain available, to improve intelligibility of speech of a second person in said second zone transmitted from said second microphone to said first loudspeaker;

said second equalization filter reduces resonance peaks in the acoustic transfer function between said first loudspeaker in said first zone and said second microphone in said second zone to reduce feedback by damping resonance peaks;

said system is in a vehicle, and each of said first and second highpass filters is vehicle speed sensitive, such that at higher vehicle speeds and resulting higher noise levels, lower frequency speech content of vehicle occupants is blocked and higher frequency speech content of vehicle occupants is passed, the lower frequency speech content of vehicle occupants being otherwise masked at higher speeds by broadband vehicle and wind noise, so that the reduced bandwidth and the absence of the lower frequency speech content of vehicle occupants does not sacrifice the perceived quality of speech, and such that at lower vehicle speeds and resulting lower noise levels, the cutoff frequency of each of said first and second highpass filters is lowered such that lower frequency speech content of vehicle occupants is passed, in addition to higher frequency speech content of vehicle occupants, to provide enriched low frequency performance, and overcome objections to a tinny sounding system in said vehicle;

wherein:

said first microphone is acoustically coupled to said second loudspeaker;

said second microphone is acoustically coupled to said first loudspeaker;

said voice sensitive gated switch comprises two voice activity detector gates, a first gate detecting the output of said first microphone, and a second gate detecting the output of said second microphone.

6. The system according to claim 5, wherein said vehicle has a speedometer, and each of said first and second highpass filters is responsive to said speedometer.

7. A simplex digital voice enhancement communication system comprising in combination:

a first acoustic zone;

a second acoustic zone;

a first microphone in said first zone;

a first loudspeaker in said first zone;

a second microphone in said second zone;

a second loudspeaker in said second zone;

a voice sensitive gated switch having a first mode supplying the output of said first microphone over a first channel to said second loudspeaker, and having a second mode supplying the output of said second microphone over a second channel to said first loudspeaker;

a first noise sensitive bandpass filter in said first channel;

a first equalization filter in said first channel;

a second noise sensitive bandpass filter in said second channel;

a second noise sensitive bandpass filter in said second channel;

a second equalization filter in said second channel, wherein:

said voice sensitive gated switch in said first mode substantially blocks transmission from said second microphone to said first loudspeaker;

said voice sensitive gated switch in said second mode substantially blocks transmission from said first microphone to said second loudspeaker;

said first and second modes of said voice sensitive gated switch are mutually exclusive such that only one of said channels can be active at a time;

said first noise sensitive bandpass filter comprises a noise responsive highpass filter having a filter cutoff effective at elevated noise levels and reducing bandwidth and making more gain available, to improve intelligibility of speech of a first person in said first zone transmitted from said first microphone to said second loudspeaker;

said first equalization filter reduces resonance peaks in the acoustic transfer function between said second loudspeaker in said second zone and said first microphone in said first zone to reduce feedback by damping resonance peaks;

said second noise sensitive bandpass filter comprises a second noise responsive highpass filter having a filter cutoff effective at elevated noise levels and reducing bandwidth and making more gain available, to improve intelligibility of speech of a second person in said second zone transmitted from said second microphone to said first loudspeaker;

said second equalization filter reduces resonance peaks in the acoustic transfer function between said first loudspeaker in said first zone and said second microphone in said second zone to reduce feedback by damping resonance peaks;

said system is in a vehicle, and each of said first and second highpass filters is vehicle speed sensitive, such that at higher vehicle speeds and resulting higher noise levels, lower frequency speech content is blocked and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech, and such that at lower vehicle speeds and resulting lower noise levels, the cutoff frequency of each of said first and second highpass filters is lowered such that lower frequency speech content is passed, in addition to higher frequency speech content, to provide enriched low frequency performance, and overcome objections to a tinny sounding system in said vehicle;

said vehicle has an in-cabin audio system, and comprising a digital voice enhancement activation switch actuating said voice sensitive gated switch and providing an audio mute signal muting said in-cabin audio system;

wherein:

said first microphone is acoustically coupled to said second loudspeaker;

said second microphone is acoustically coupled to said first loudspeaker;

said voice sensitive gated switch comprises two voice activity detector gates, a first gate detecting the output of said first microphone and a second gate detecting the output of said second microphone.

\* \* \* \* \*